United States Patent
Kalyanasundharam et al.

(10) Patent No.: US 11,196,657 B2
(45) Date of Patent: Dec. 7, 2021

(54) SELF IDENTIFYING INTERCONNECT TOPOLOGY

(71) Applicant: Advanced Micro Devices, Inc., Sunnyvale, CA (US)

(72) Inventors: Vydhyanathan Kalyanasundharam, San Jose, CA (US); Eric Christopher Morton, Austin, TX (US); Alan Dodson Smith, Austin, TX (US); Joe G. Cruz, North Grafton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/850,616

(22) Filed: Dec. 21, 2017

(65) Prior Publication Data
US 2019/0199617 A1  Jun. 27, 2019

(51) Int. Cl.
*H04L 12/751* (2013.01)
*G06F 13/42* (2006.01)
(Continued)

(52) U.S. Cl.
CPC .......... *H04L 45/02* (2013.01); *G06F 13/364* (2013.01); *G06F 13/4022* (2013.01);
(Continued)

(58) Field of Classification Search
CPC ....... H04L 45/02; H04L 45/745; H04L 49/15; H04L 2213/0016; G06F 16/9038;
(Continued)

(56) References Cited

U.S. PATENT DOCUMENTS

| 4,760,515 A | 7/1988 | Malmquist et al. |
| 5,553,223 A | 9/1996 | Greenlee et al. |

(Continued)

FOREIGN PATENT DOCUMENTS

| WO | 96/38791 A1 | 12/1996 |
| WO | 2000031925 | 6/2000 |

OTHER PUBLICATIONS

International Search Report and Written Opinion in International Application No. PCT/US2018/051782, dated Jan. 4, 2019, 14 pages.
(Continued)

*Primary Examiner* — Un C Cho
*Assistant Examiner* — Yu-Wen Chang
(74) *Attorney, Agent, or Firm* — Kowert Hood Munyon Rankin and Goetzel PC; Rory D. Rankin

(57) ABSTRACT

A system for automatically discovering fabric topology includes at least one or more processing units, one or more memory devices, a security processor, and a communication fabric with an unknown topology coupled to the processing unit(s), memory device(s), and security processor. The security processor queries each component of the fabric to retrieve various attributes associated with the component. The security processor utilizes the retrieved attributes to create a network graph of the topology of the components within the fabric. The security processor generates routing tables from the network graph and programs the routing tables into the fabric components. Then, the fabric components utilize the routing tables to determine how to route incoming packets.

20 Claims, 7 Drawing Sheets

(51) Int. Cl.

| | | |
|---|---|---|
| *G06F 13/364* | (2006.01) | |
| *H04L 12/933* | (2013.01) | |
| *H04L 12/741* | (2013.01) | |
| *G06F 13/40* | (2006.01) | |
| *G06F 16/901* | (2019.01) | |
| *G06F 16/9038* | (2019.01) | |
| *H04L 29/06* | (2006.01) | |
| *G06F 21/57* | (2013.01) | |

(52) U.S. Cl.
CPC ...... *G06F 13/4282* (2013.01); *G06F 16/9024* (2019.01); *G06F 16/9038* (2019.01); *G06F 21/575* (2013.01); *H04L 45/745* (2013.01); *H04L 49/15* (2013.01); *H04L 63/20* (2013.01); *G06F 2213/0016* (2013.01)

(58) Field of Classification Search
CPC ............. G06F 16/9024; G06F 13/4022; G06F 13/364; G06F 13/4282; G06F 2213/0016
See application file for complete search history.

(56) References Cited

U.S. PATENT DOCUMENTS

| | | | |
|---|---|---|---|
| 5,706,502 | A | 1/1998 | Foley et al. |
| 5,761,513 | A | 6/1998 | Yellin et al. |
| 5,815,653 | A | 9/1998 | You et al. |
| 5,923,885 | A | 7/1999 | Johnson et al. |
| 6,058,393 | A | 5/2000 | Meier et al. |
| 6,119,247 | A | 9/2000 | House et al. |
| 6,138,140 | A | 10/2000 | Yokote |
| 6,618,854 | B1 | 9/2003 | Mann |
| 7,394,290 | B2 | 7/2008 | Seo et al. |
| 7,596,647 | B1 | 9/2009 | Van Dyke et al. |
| 8,448,001 | B1 | 5/2013 | Zhu et al. |
| 9,529,400 | B1 | 12/2016 | Kumar et al. |
| 9,594,621 | B1* | 3/2017 | Navilappa ............ G06F 11/0793 |
| 9,886,414 | B2* | 2/2018 | Yun ........................ G06F 1/3237 |
| 9,971,700 | B2 | 5/2018 | Loh |
| 9,983,652 | B2 | 5/2018 | Piga et al. |
| 10,067,796 | B1 | 9/2018 | Metcalf |
| 2002/0176306 | A1 | 11/2002 | Abe et al. |
| 2003/0035371 | A1 | 2/2003 | Reed et al. |
| 2003/0172149 | A1 | 9/2003 | Edsall et al. |
| 2003/0191857 | A1 | 10/2003 | Terrell et al. |
| 2004/0093404 | A1* | 5/2004 | Snyder .................... H04L 41/12 709/223 |
| 2005/0198459 | A1 | 9/2005 | Bogin et al. |
| 2005/0228531 | A1* | 10/2005 | Genovker ............... H04L 41/00 700/130 |
| 2006/0109829 | A1 | 5/2006 | O'Neill |
| 2006/0165115 | A1* | 7/2006 | Warren ................. H04L 49/357 370/458 |
| 2006/0171329 | A1 | 8/2006 | Ying |
| 2008/0120441 | A1 | 5/2008 | Loewenstein |
| 2008/0126750 | A1 | 5/2008 | Sistla |
| 2009/0016355 | A1* | 1/2009 | Moyes .................... H04L 45/02 370/395.31 |
| 2009/0168782 | A1 | 7/2009 | Beshai |
| 2010/0211720 | A1 | 8/2010 | Satpathy et al. |
| 2011/0035529 | A1* | 2/2011 | Wang .................. G06F 13/1663 710/317 |
| 2011/0119526 | A1 | 5/2011 | Blumrich et al. |
| 2011/0138098 | A1 | 6/2011 | Satpathy et al. |
| 2011/0219208 | A1 | 9/2011 | Asaad et al. |
| 2012/0059962 | A1 | 3/2012 | Lai |
| 2012/0072563 | A1* | 3/2012 | Johnsen ............... H04L 12/462 709/223 |
| 2012/0221767 | A1 | 8/2012 | Post et al. |
| 2014/0192583 | A1 | 7/2014 | Rajan et al. |
| 2014/0201471 | A1 | 7/2014 | Cutter et al. |
| 2014/0281083 | A1 | 9/2014 | Canepa et al. |
| 2015/0120978 | A1 | 4/2015 | Kalyanasundharam et al. |
| 2015/0220460 | A1 | 8/2015 | Litch et al. |
| 2015/0269396 | A1* | 9/2015 | Grafton .................... G06F 21/74 726/2 |
| 2016/0094435 | A1 | 3/2016 | Goss et al. |
| 2016/0127191 | A1* | 5/2016 | Nair ........................ H04L 41/12 709/224 |
| 2016/0188473 | A1* | 6/2016 | Kruckemyer ....... G06F 12/0815 711/141 |
| 2016/0191420 | A1 | 6/2016 | Nagarajan et al. |
| 2016/0210381 | A1 | 7/2016 | Singleton et al. |
| 2016/0277817 | A1* | 9/2016 | Lee ......................... H04L 45/02 |
| 2016/0323161 | A1* | 11/2016 | Cuervo Laffaye .... G06F 9/5044 |
| 2016/0378168 | A1 | 12/2016 | Branover et al. |
| 2017/0230733 | A1* | 8/2017 | Rana ...................... H04L 67/10 |
| 2017/0339106 | A1* | 11/2017 | Rimmer ............. H04L 12/6418 |
| 2018/0048562 | A1* | 2/2018 | Meyer .................. H04L 43/028 |
| 2018/0063016 | A1 | 3/2018 | Gulati et al. |
| 2018/0067775 | A1 | 3/2018 | Frandzel et al. |
| 2018/0241632 | A1* | 8/2018 | Shetty .................... H04L 41/22 |
| 2019/0108143 | A1 | 4/2019 | Smith et al. |
| 2019/0108861 | A1 | 4/2019 | Tsien et al. |

OTHER PUBLICATIONS

Non-Final Office Action in U.S. Appl. No. 15/725,912, dated Jul. 12, 2018, 10 pages.
Final Office Action in U.S. Appl. No. 15/725,912, dated Feb. 7, 2019, 15 pages.
International Search Report and Written Opinion in International Application No. PCT/US2018/051542, dated Dec. 12, 2018, 12 pages.
Non-Final Office Action in U.S. Appl. No. 15/728,191, dated Mar. 6, 2019, 29 pages.
Notice of Allowance in U.S. Appl. No. 15/728,191, dated Oct. 9, 2019, 10 pages.
Non-Final Office Action in U.S. Appl. No. 15/725,912, dated Sep. 20, 2019, 13 pages.
Notice of Allowance in U.S. Appl. No. 15/725,912, dated Aug. 6, 2020, 9 pages.

* cited by examiner

SELF IDENTIFYING INTERCONNECT TOPOLOGY

BACKGROUND

Description of the Related Art

Computing systems are increasingly integrating large numbers of different types of components on a single integrated circuit (i.e., chip) or on a multi-chip module. The complexity and power consumption of a system increases with the number of different types of components. Often, these components are connected together via switches, routers, communication buses, bridges, buffers, controllers, coherent devices, and other links. The combination of these interconnecting components is referred to herein as a "communication fabric", or "fabric" for short.

Generally speaking, the fabric facilitates communication by routing messages between a plurality of components on a chip or multi-chip module. Examples of messages communicated over a fabric include memory access requests, status updates, data transfers, coherency probes, coherency probe responses, and the like. As computing systems increase in complexity, the interconnecting fabric to couple and communicate between the system components is also increasing in complexity. Assigning labels and routes statically is typically not viable, nor can assumptions be made about the regularity of the fabric topology. Accordingly, improved techniques for managing an irregular fabric topology are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
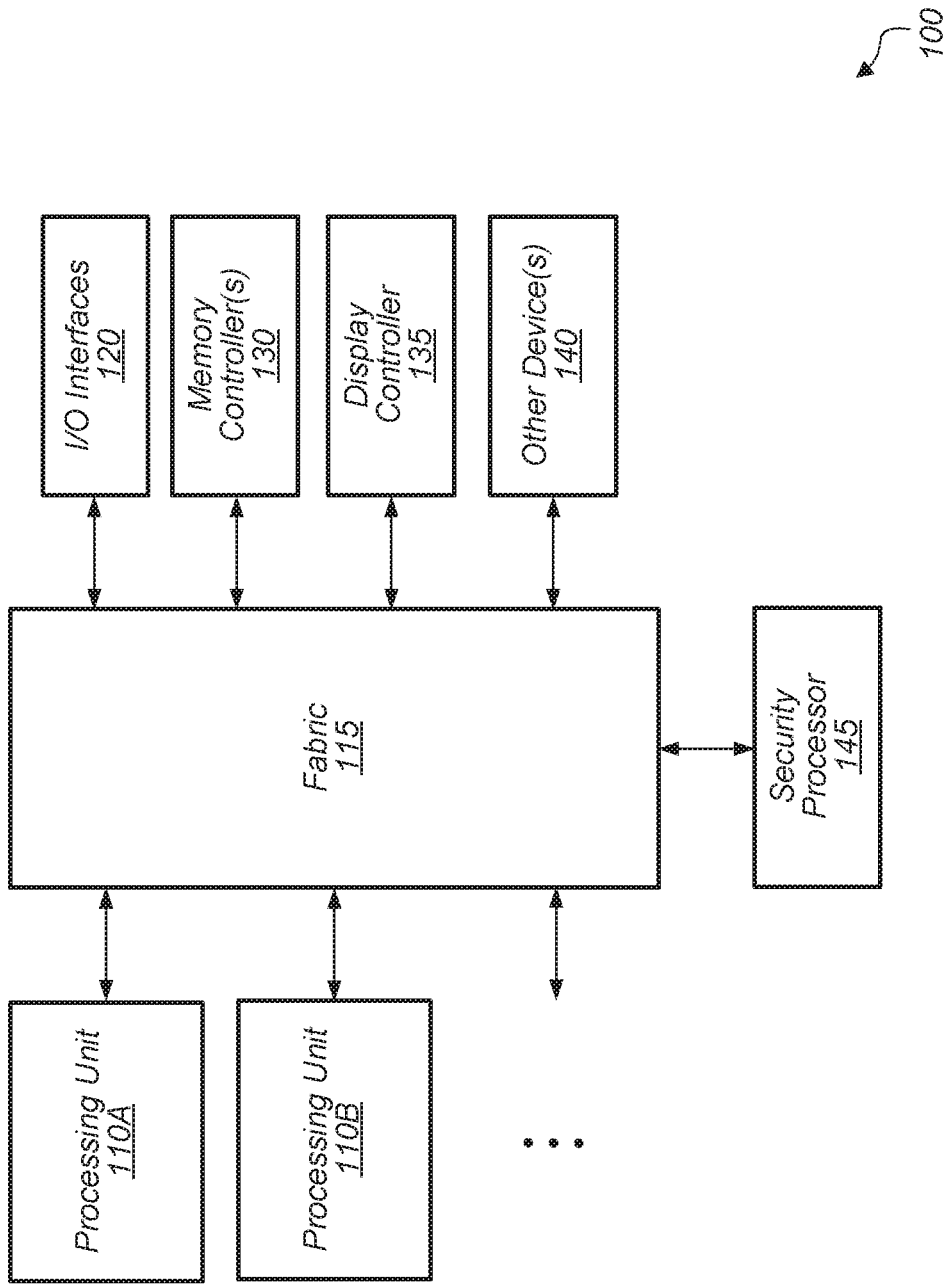
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a self-identifying discovery process for an interconnect fabric topology are disclosed herein. In one embodiment, a system includes at least one or more processing units, one or more input/output (I/O) interfaces, an interconnect fabric of unknown topology, and one or more memory devices. In one embodiment, a system implements an autonomous bootstrap discovery process that can operate on arbitrary fabric topologies. To simplify programming of different fabric systems, a general solution for discovery and programming of an arbitrary network on chip (NoC) is implemented when the fabric spans multiple nodes (die or sockets). In one embodiment, a set of information registers as well as algorithms are implemented to traverse the network blocks, discovering the block type and capabilities as well as the connectivity between network components.

In one embodiment, fabric discovery is performed by a security processor. In another embodiment, fabric discovery is performed by a system management processor. In other embodiments, fabric discovery can be performed by other types of components. In one embodiment, fabric discovery is performed as part of the design flow where information obtained during fabric discovery is used to create reset conditions in system hardware. In one embodiment, fabric discovery begins with the security processor reading a fabric block instance count register. The fabric block instance count register stores an indication of the total number of fabric blocks in the system and the fabric block instance count register is present in the system at a fixed address. The fabric block instance count register allows for the firmware to have a general starting point regardless of the size or topology of the system.

Once the total number of fabric blocks is retrieved from the fabric block instance count register, the security processor proceeds through each of the blocks to read the block instance information registers. These registers contain information such as the block type (e.g., coherent master, non-coherent master, crossbar, coherent slave, non-coherent slave), types and number of command and data ports, data bus width, clock speed, neighbor instance identifiers (IDs), fabric IDs, and other attributes. Once this information has been obtained for each block, a network graph is constructed as a data structure for use in further processing. Routing algorithms can be run based on the network graph to determine the desired routing for the NoC as well as the multi-node system. Once the routes, block types, and capabilities are discovered, the firmware proceeds to program the masters, slaves, and switches appropriately for fabric initialization.

Referring now to FIG. 1, a block diagram of one embodiment of a computing system 100 is shown. In one embodiment, computing system 100 includes at least processing units 110A-B, fabric 115, input/output (I/O) interfaces 120, memory controller(s) 130, display controller 135, other device(s) 140, and security processor 145. In other embodiments, computing system 100 can include other components and/or computing system 100 can be arranged differently. Processing units 110A-B are representative of any number and type of processing units. For example, in one embodiment, processing unit 110A is a central processing unit (CPU) and processing unit 110B is a graphics processing unit (GPU). In other embodiments, processing units 110A-B can include other numbers and types of processing units (e.g., digital signal processor (DSP), field programmable gate array (FPGA), application specific integrated circuit (ASIC)).

Fabric 115 is representative of any communication interconnect with any of various types of protocols utilized for communicating among the components of the system 100. Fabric 115 provides the data paths, switches, routers, and other logic that connect the processing units 110A-B, I/O interfaces 120, memory controller(s) 130, display controller 135, and other device(s) 140 to each other. Fabric 115 handles the request, response, and data traffic, as well as probe traffic to facilitate coherency. Fabric 115 also handles interrupt request routing and configuration access paths to the various components of system 100. Additionally, fabric 115 handles configuration requests, responses, and configuration data traffic. Fabric 115 can be bus-based, including shared bus configurations, crossbar configurations, and hierarchical buses with bridges. Fabric 115 can also be packet-based, and can be hierarchical with bridges, crossbar, point-to-point, or other interconnects. From the point of view of fabric 115, the other components of system 100 can be referred to as "clients". Fabric 115 is configured to process requests generated by various clients and pass the requests on to other clients.

In one embodiment, security processor 145 is configured to initiate an autonomous discovery of the topology of the components of fabric 115. This can be useful in situations where system 100 does not have a regular configuration, and where various different types of capabilities can be included within different implementations of system 100. For example, one implementation of system 100 can include 16 processor cores and two memory channels per core, while a second implementation of system 100 can include 8 processor cores and one memory channel per core. Other implementations of system 100 can include other numbers of cores, memory channels, memory controllers, memory devices, and so forth. As such, the ability to configure and initialize fabric 115 prior to system boot-up is limited. Accordingly, in these circumstances, security processor 145 is configured to discover the unique topology of a given implementation of system 100 during the initial boot-up of system 100.

In one embodiment, security processor 145 is configured to query each component of fabric 115 to retrieve various attributes associated with the component. In one embodiment, each component of fabric 115 includes one or more registers to store values specifying the attributes of the respective component. Then, after querying the components of fabric 115, security processor 145 is configured to create a network graph based on the attributes retrieved from the various components. Next, security processor 145 is configured to program masters, slaves, and switches for fabric initialization based on the determined routes, block types, and capabilities. For example, in one embodiment, after creating the network graph, security processor 145 is configured to generate routing tables from the network graph. In this embodiment, security processor 145 programs the routing tables into the various components of fabric 115. Then, the components of fabric 115 utilize the programmed routing tables to determine how to route received packets.

In one embodiment, security processor 145 is also configured to manage the configuration and security of system 100. Security processor 145 is configured to execute instructions for performing authentication and validation functions which provide security protection for system 100. Also, security processor 145 stores one or more unique encryption/decryption keys inaccessible to the rest of system 100. Accordingly, security processor 145 provides a hardware-based root of trust for system 100, allowing system 100 to start up in a secure environment. In one embodiment, security processor 145 manages the boot-up process of system 100 to ensure that system 100 boots up with authenticated boot code. Security processor 145 also manages various other functions associated with the boot-up process of system 100. Then, security processor 145 releases processing units 110A-N to execute the boot code and to launch the operating system of system 100.

Memory controller(s) 130 are representative of any number and type of memory controllers which can be coupled to any number and type of memory device(s). For example, the type of memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. Memory controller(s) 130 are accessible by processing units 110A-B, I/O interfaces 120, display controller 135, and other device(s) 140 via fabric 115. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Other device(s) 140 are representative of any number and type of devices (e.g., multimedia device, video codec).

In various embodiments, computing system 100 can be a computer, laptop, mobile device, server or any of various other types of computing systems or devices. It is noted that the number of components of computing system 100 can vary from embodiment to embodiment. There can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
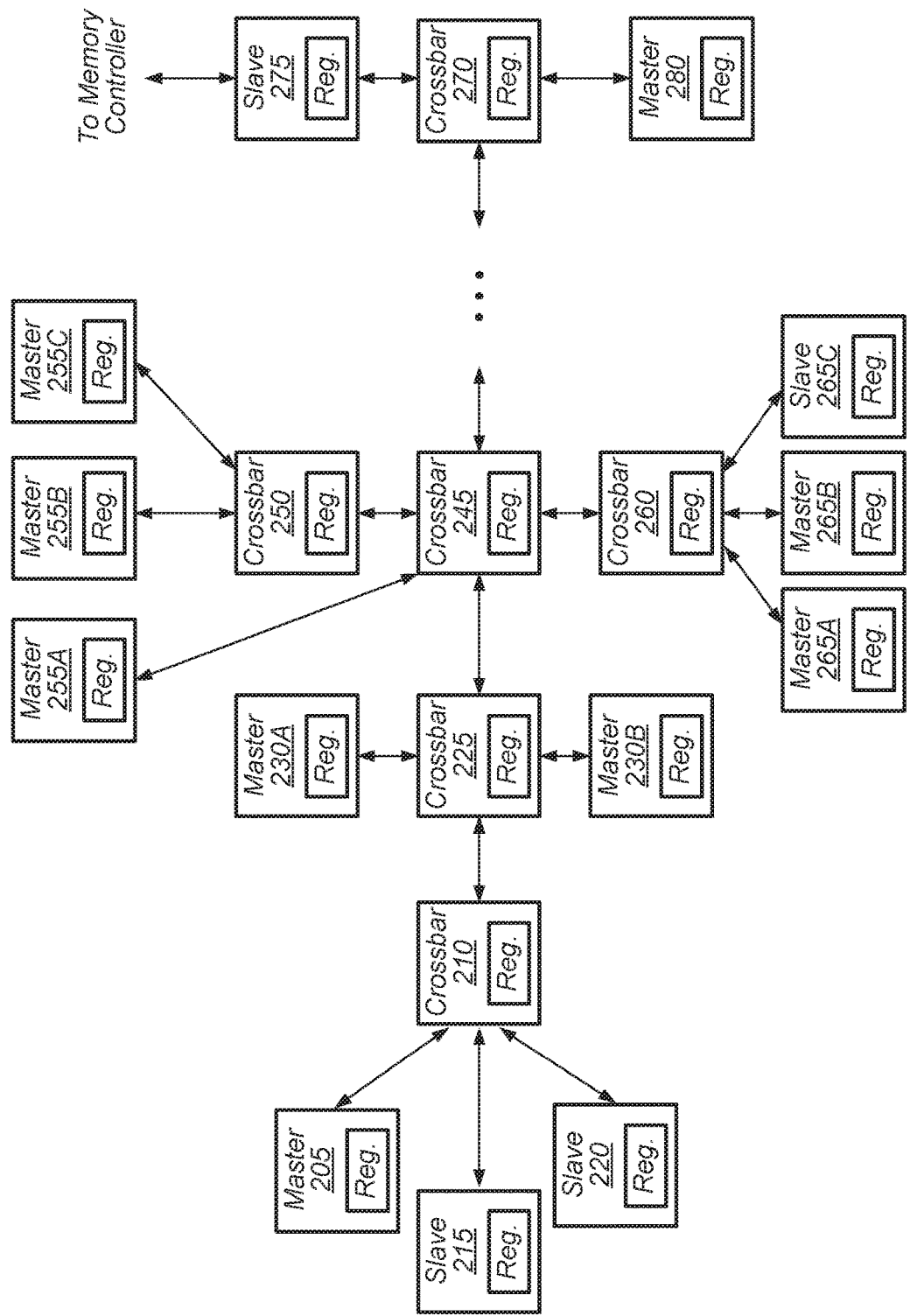
FIG. 2 is a block diagram of one embodiment of a fabric.

Turning now to FIG. 2, a block diagram of one embodiment of a fabric 200 is shown. In one embodiment, fabric 200 can be implemented as fabric 115 of computing system 100 (of FIG. 1). In one embodiment, fabric 200 includes a plurality of different components arranged into an irregular topology. In some embodiments, fabric 200 is partitioned into a plurality of regions, with any number of components per region and any type of topology for each region. In one embodiment, each region of fabric 200 is associated with a different power-gating domain.

On the left-side of FIG. 2, fabric 200 includes master 205 and slaves 215 and 220 coupled to crossbar 210. As used herein, a "master" is defined as a component that generates requests, and a "slave" is defined as a component that services requests. Crossbar 210 is coupled to crossbar 225, with crossbar 225 coupled to masters 230A-B. Crossbar 225 is coupled to crossbar 245, with crossbar 245 coupled to crossbars 250 and 260 and to master 255A. Crossbar 250 is coupled to masters 255B-C and crossbar 260 is coupled to masters 265A-B and slave 265C. At the far-right of FIG. 2, fabric 200 includes crossbar 270 coupled to slave 275 and master 280. In one embodiment, slave 275 is coupled to a memory controller.

In one embodiment, each component of fabric 200 includes a register to store attributes specifying information about the respective component. For example, in one embodiment, the register stores information such as component type, types and number of command and data ports, data bus width, clock speed, neighbor instance IDs, fabric IDs, as well as other information. In one embodiment, a security processor (e.g., security processor 145 of FIG. 1) is configured to query each component of fabric 200 to retrieve the information stored in a corresponding register. The security processor can then utilize this information to create a network graph of fabric 200 and routing tables based on the network graph.

It is noted that the layout, number, and type of components of fabric 200 is merely indicative of one embodiment. In other embodiments, fabric 200 can be arranged differently and/or include other numbers and types of components. It is also noted that the various crossbars 210, 225, 245, 250, 260, and 270 which are part of fabric 200 can also be referred to as switches or routers. A crossbar can include switch connections and buffering to buffer requests which are received by the crossbar. A crossbar can also include credit control logic to implement a flow control mechanism for transmitting requests from source to destination. Each crossbar allows for requests to connect from any source to any of the destinations coupled to the crossbar. Each crossbar also includes one or more connections to other crossbars to enable requests to be sent to other destinations which are not directly coupled to the respective crossbar.

Figure 3:
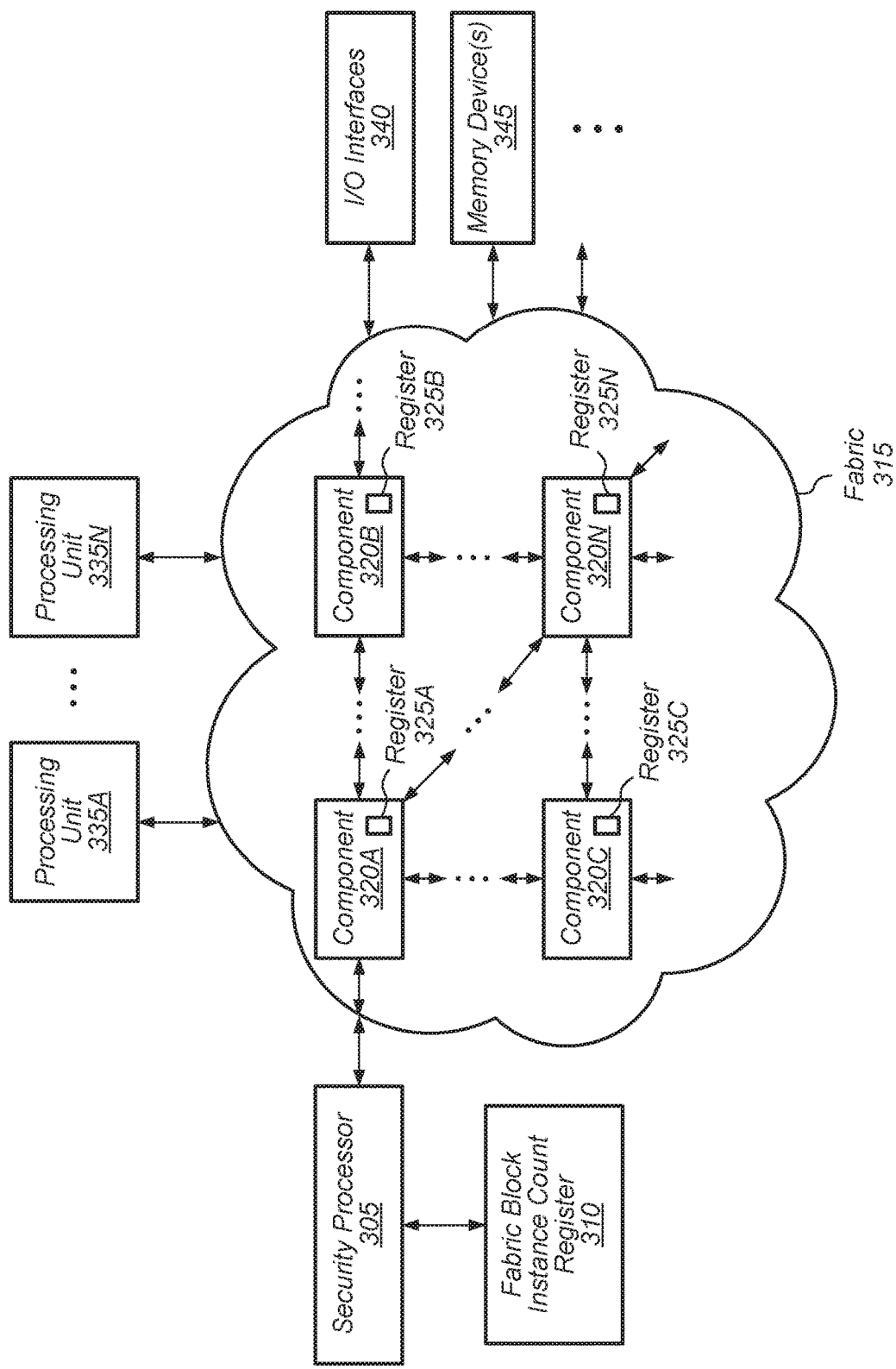
FIG. 3 is a block diagram of another embodiment of a computing system.

Referring now to FIG. 3, a block diagram of another embodiment of a computing system 300 is shown. System 300 includes at least security processor 305, fabric block instance count register 310, fabric 315, processing units 335A-N, I/O interfaces 340, memory controller(s) 345, and any number of other components which are not shown to avoid obscuring the figure. In one embodiment, when system 300 initially powers up, system 300 does not have any knowledge of the topology or structure of fabric 315, and system 300 is configured to discover this topology as part of the boot-up process. As a result, fabric topology discovery provides flexibility to build different types of systems with a variety of network topologies and resources using the same basic components.

In one embodiment, security processor 305 is configured to query fabric block instance count register 310 to retrieve an indication of the total number of components 320A-N of fabric 315. Then, security processor 305 initiates the automatic discovery process of components 320A-N of fabric 315. Security processor 305 can be implemented using any suitable combination of software, hardware, and/or firmware. In one embodiment, security processor 305 is a dedicated microprocessor configured to perform various security functions for system 300. For example, in this embodiment, security processor 305 is configured to provide a hardware-based root of trust for system 300.

Components 320A-N are representative of any number and type of components arranged in any type of topology within fabric 315. For example, components 320A-N can include crossbars, switches, routers, non-coherent masters, coherent masters, non-coherent slaves, coherent slaves, and so on. It is noted that components 320A-N can also be referred to as "blocks" herein. In one embodiment, each component 320A-N has a corresponding register 325A-N which stores various metadata for the respective component. Each register 325A-N is representative of any number of registers or other types of storage locations for storing any number of attributes. For example, each register 325A-N can specify a component type, type and number of command and data ports, data bus width, clock speed, neighbor instance IDs, fabric IDs, and so on.

In one embodiment, security processor 305 is configured to traverse the components 320A-N of fabric 315 one at a time. In one embodiment, security processor 305 is coupled to the components 320A-N of fabric 315 via the main data paths. In another embodiment, security processor 305 is coupled to the components 320A-N of fabric 315 via sideband connections which are different from the main data path connections which packets traverse when flowing through fabric 315. To initiate the automatic discovery process, security processor 305 starts by querying register 325A of the nearest component 320A to security processor 305. Then, security processor 305 continues by querying the neighbors of component 320A. In one embodiment, each component 320A-N is assigned a unique ID within fabric 315.

Security processor 305 continues traversing fabric 315 through the neighbors of neighbors and so on until the edges of fabric 315 are reached. After security processor 305 has retrieved metadata from registers 325A-N of all of the components 320A-N, security processor 305 is configured to build a network graph of the discovered components. Then, security processor 305 utilizes the network graph to generate routing tables for each component 320A-N. After generating the routing tables, security processor 305 conveys a routing table to each component 320A-N for use in determining how to route received packets.

Figure 4:
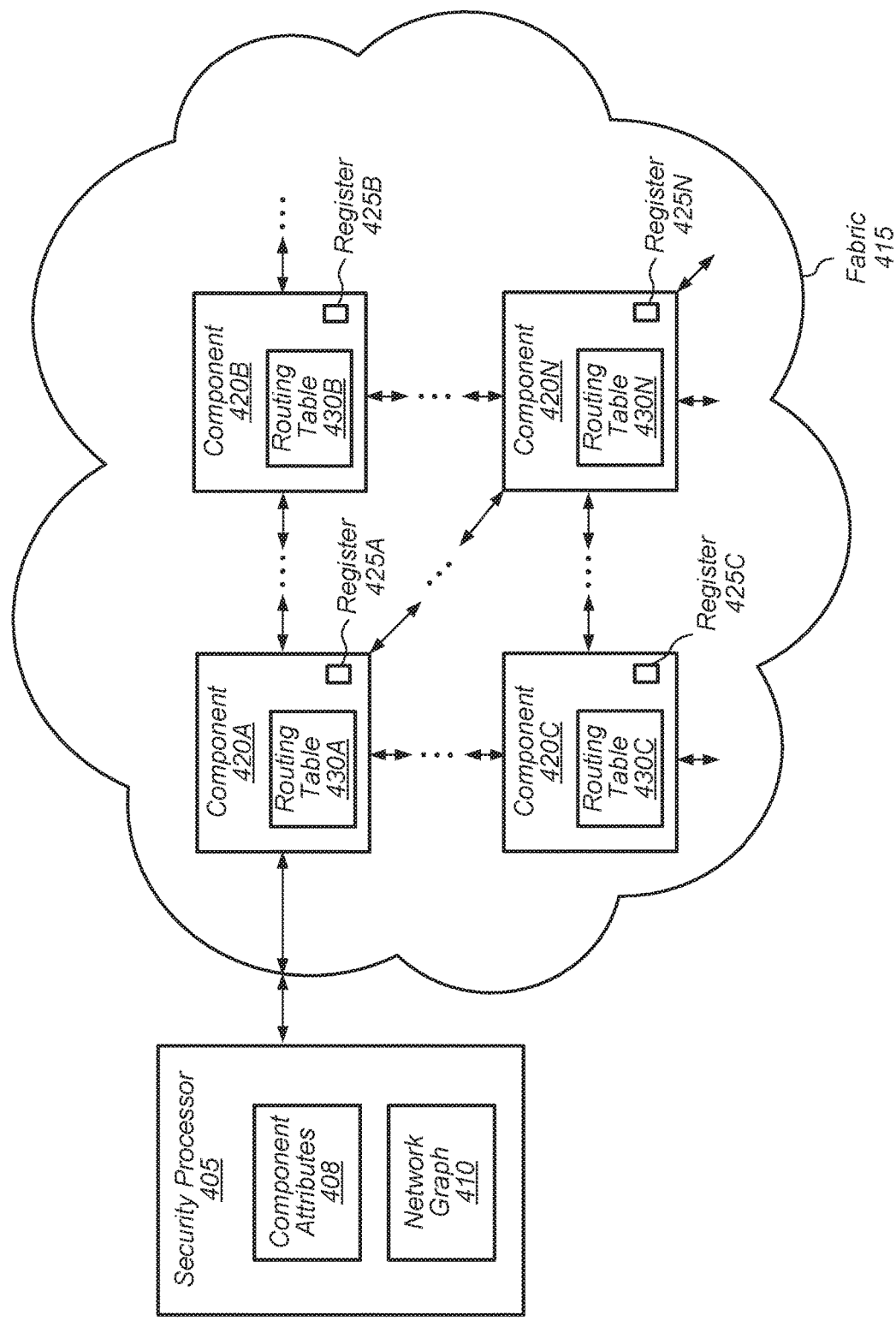
FIG. 4 is a block diagram of one embodiment of a security processor coupled to a fabric.

Turning now to FIG. 4, a block diagram of one embodiment of a security processor 405 coupled to a fabric 415 is shown. Security processor 405 is configured to retrieve component attributes 408 from registers 425A-N of components 420A-N of fabric 415 during a fabric discovery process as previously described in the discussion regarding FIG. 3. After retrieving component attributes 408, security processor 405 is configured to create network graph 410 to represent the components and topology of component interconnections of fabric 415.

In one embodiment, security processor 405 utilizes network graph 410 to generate routing tables 430A-N. For example, security processor 405 traverses network graph 410 by starting at a given node of network graph 410, with the given node representing a given component. Then, the security processor 405 traverses network graph 410 from the given node until reaching the leaf nodes while tracking the connections originating from the given node. Security processor 405 utilizes each traversed path from the given node to a leaf node to construct a routing table for the given node. After constructing the routing table, security processor 405 programs the given component with this routing table. Security processor 405 can then perform a similar process for the other nodes of network graph 410.

For example, security processor 405 utilizes network graph 410 to generate a routing table 430A for component 420A, and then security processor 405 programs routing table 430A into component 420A. During operation of the host system which contains fabric 415, component 420A utilizes routing table 430A to determine how to route incoming packets. Similarly, security processor 405 programs routing tables 430B-N into components 420B-N, respectively, and then components 420B-N utilize their corresponding routing tables 430B-N to determine how to route received packets during actual operation of the host system. It should be understood that fabric 415 does not come pre-programmed with routing tables, but rather, the routing tables 430A-N are generated during the self-discovery process which is implemented during initialization of the host system.

Figure 5:
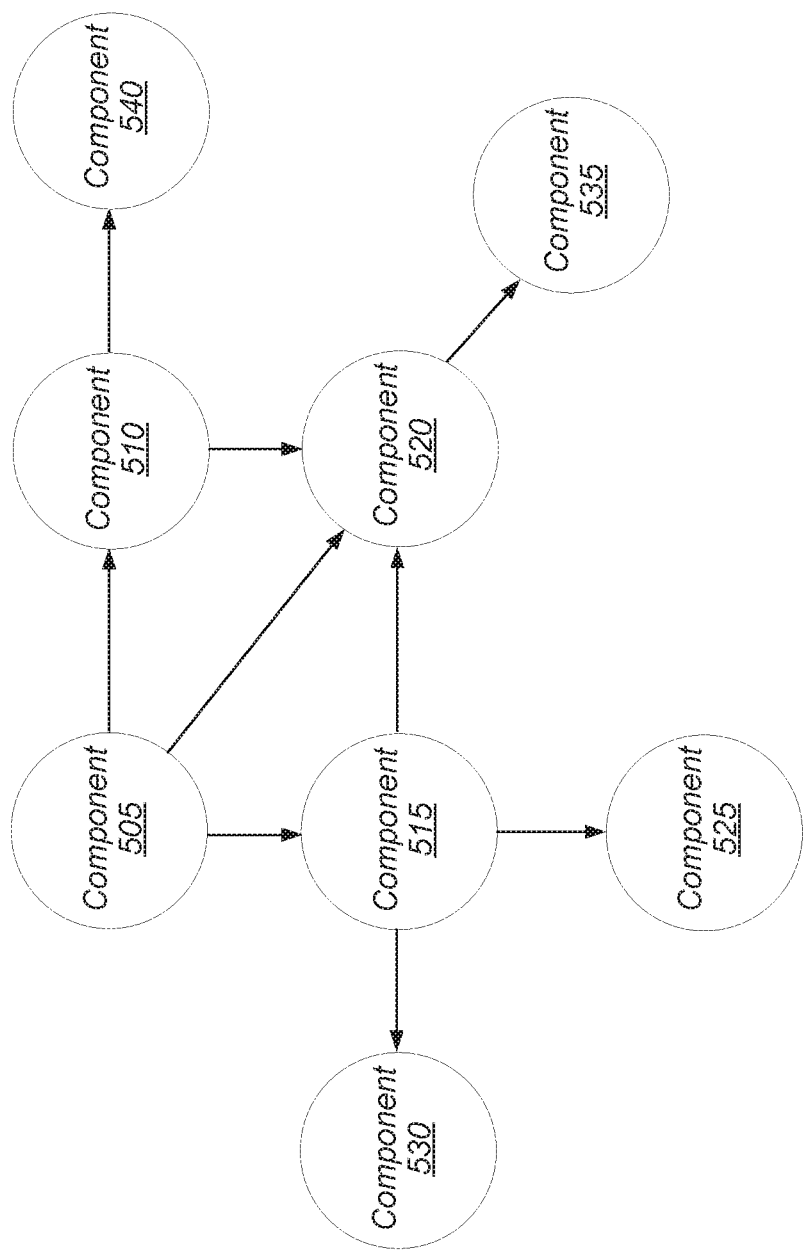
FIG. 5 is a block diagram of one embodiment of a network graph.

Turning now to FIG. 5, a block diagram of one embodiment of a network graph 500 is shown. Network graph 500 includes nodes which are representative of the components of a fabric which have been detected during an automatic discovery process. In one embodiment, the components of the fabric are modeled as the interacting nodes of network graph 500. A security processor (e.g., security processor 305 of FIG. 3) is configured to detect and query the various components of the fabric to retrieve attributes associated with these components. In one embodiment, the security processor stores the attributes of the fabric components in entries of a table, with a separate entry for each component and a separate column for each attribute. Then, the security processor is configured to create network graph 500 based on the retrieved attributes in the entries of the table.

Network graph 500 is intended to represent the components of a given interconnect fabric. Each node of network graph 500 represents a component of the fabric which was discovered during the discovery process. For example, as shown in FIG. 5, network graph includes component 505 coupled to components 510, 515 and 520, component 520 coupled to components 505, 510, 515 and 535, component 530 coupled to component 515, component 525 coupled to component 515, component 535 coupled to component 520, and component 540 coupled to component 510. After creating network graph 500, the security processor utilizes network graph 500 to generate routing tables for each of the components of the fabric. Then, the security processor programs the routing tables into the components, allowing the components to utilize the routing tables when determining how to route received packets. It is noted that network graph 500 is merely one representation of a network graph. In other embodiments, other types of network graphs can be created by a security processor.

Figure 6:
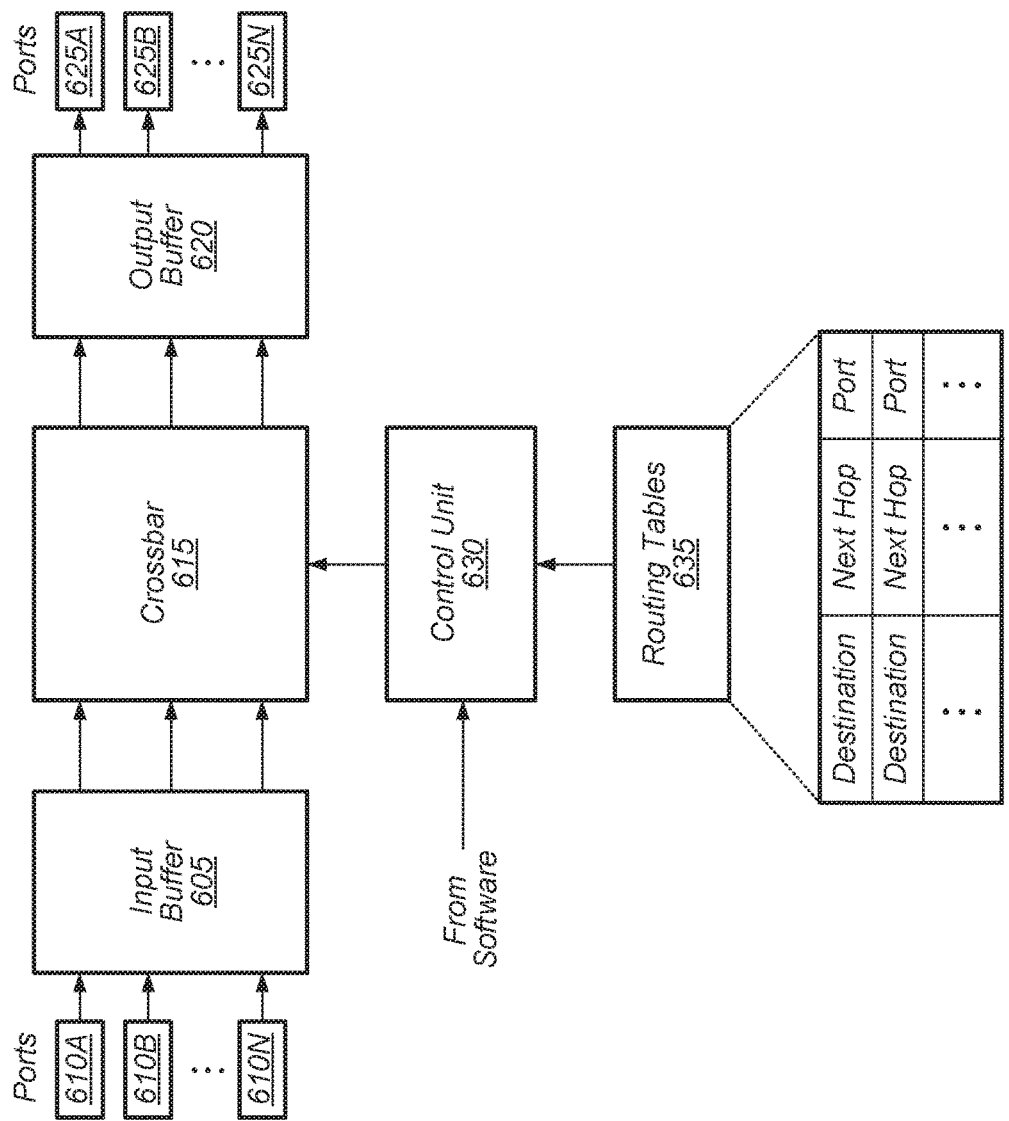
FIG. 6 is a block diagram of one embodiment of a fabric component.

Turning now to FIG. 6, a block diagram of one embodiment of a fabric component 600 is shown. In one embodiment, fabric component 600 includes an input buffer 605, a crossbar 615, an output buffer 620, a control unit 630, and one or more routing tables 635. The input buffer 605 is coupled to one or more input ports 610A-N. Each input port 610A-N is coupled to a corresponding component internal or external to the fabric, and input buffer 605 is configured to buffer message data received via input ports 610A-N. Similarly, output buffer 620 is connected to one or more output ports 625A-N. Each output port 625A-N is coupled to a corresponding component internal or external to the fabric, and output buffer 620 is configured to buffer message data received from crossbar 615 for the corresponding link. In one embodiment, each of components 320A-N (of FIG. 3) include the logic of fabric component 600. It should be understood that the arrangement in logic in fabric component 600 is representative of one particular embodiment. In other embodiments, other suitable arrangements of logic can be utilized and/or other logic can be included in fabric component 600.

In one embodiment, crossbar 615 includes multiplexers that switch packets flowing from input ports 610A-N to output ports 625A-N based on control signaling provided by control unit 630. In one embodiment, control unit 630 utilizes configuration parameters specified by software and routing information represented in the one or more routing tables 635 to control crossbar 615 to effect a particular routing of input message data from an input port 610A-N to an output port 625A-N. Control unit 630 inspects incoming message headers, performs lookups of routing tables 635 to determine the next hop, and controls crossbar 615 to forward the data to the proper output port 625A-N. Control unit 630 also manages virtual channels, implements arbitration and filtering per the configuration data provided by software, and otherwise implements components of one or more routing protocols.

In various embodiments, routing tables 635 provide routing information for packets that pass though fabric component 600. In one embodiment, routing tables 635 are implemented as a plurality of table entries, with each entry associated with corresponding destination, next hop, and port fields according to the specified routing path between a source component and a destination component. In other embodiments, the entries of routing tables 635 can also contain other fields used by control unit 630 such as alternate routes, path length, link error status, and so on. The next hop field can be the address of the next component for a multi-hop route or the next hop field can be the same as the destination if the next hop is the final destination. In various embodiments, the entries of tables 635 are determined at run-time during an autonomous discovery process.

Accordingly, tables 635 are writeable or otherwise programmable to implement varying routes or to enable reconfiguration for different numbers or arrangements of die or network topologies. In various embodiments, tables 635 can be implemented using any of a variety of configurable storage elements, such as a register file, in RAM or flash memory, and the like. These configurable elements and writeable table entries can be managed by a number of elements, including an operation system, hypervisor, security processor, a basic input/output system (BIOS), firmware, or a combination thereof. As an example, during system boot-up, a security processor (e.g., security processor 305 of FIG. 3) can program routing tables 635 after discovering the topology of the overall fabric, component population, and system interconnections. In one embodiment, the topology of the fabric is unknown beforehand, with varying numbers of components and connections that vary between different versions and implementations of the physical system. In one embodiment, a security processor is configured to inspect the crossbar and interconnection topology to discover the implemented fabric topology. The security processor can also reconfigure the components to implement quality of service policies such as network and memory bandwidth guarantees.

Figure 7:
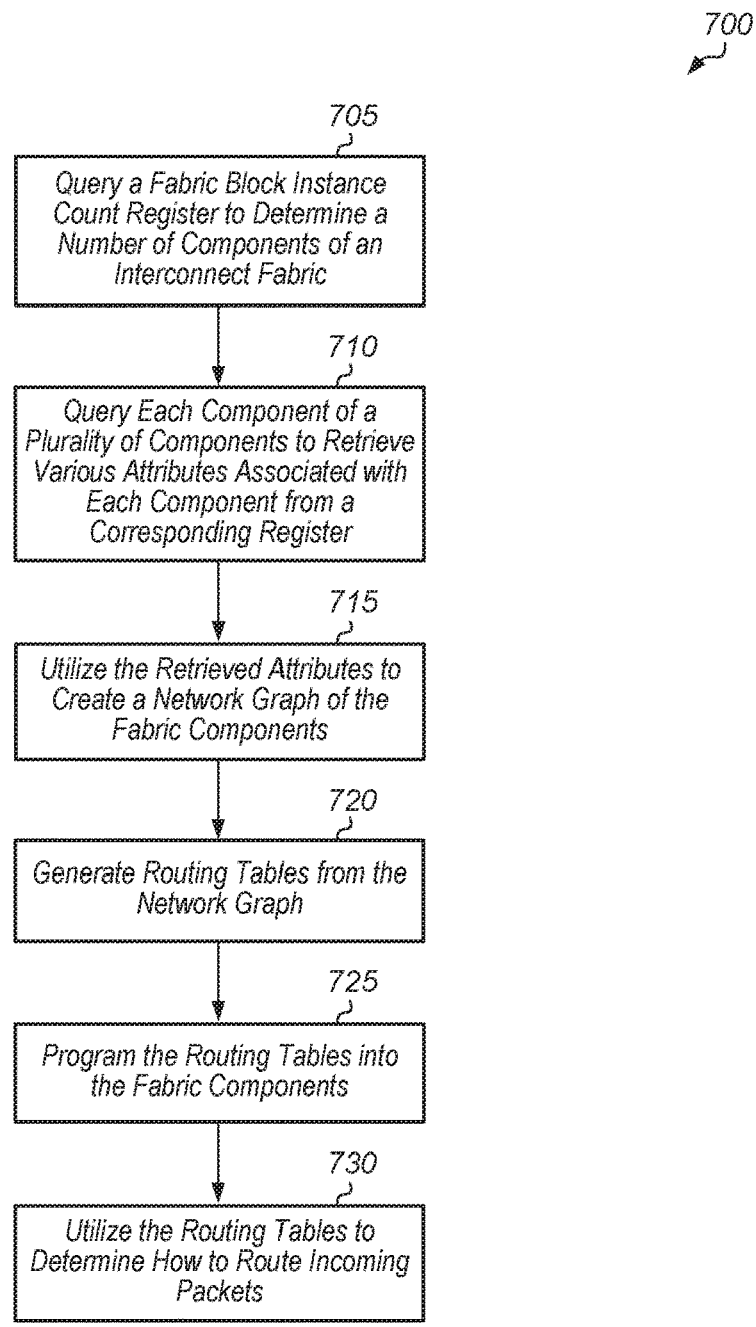
FIG. 7 is a generalized flow diagram illustrating one embodiment of a method for performing an automatic discovery process of a fabric topology.

Referring now to FIG. 7, one embodiment of a method 700 for performing an automatic discovery process of a fabric topology is shown. For purposes of discussion, the steps in this embodiment are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A processor (e.g., security processor 305 of FIG. 3) queries a fabric block instance count register (e.g., fabric block instance count register 310) to determine a number of components of an interconnect fabric (block 705). Next, the processor queries each component of a plurality of components to retrieve various attributes associated with each component from a corresponding register (block 710). In various embodiments, the attributes can include block type (e.g., coherent master, non-coherent master, crossbar, coherent slave, non-coherent slave), types and number of command and data ports, data bus width, clock speed, neighbor instance identifiers (IDs), fabric IDs, and other attributes.

Then, the processor utilizes the retrieved attributes to create a network graph of the fabric components (block 715). Next, the processor generates routing tables from the network graph (block 720). Then, the processor programs the routing tables into the fabric components (block 725). After being programmed with the routing tables, the fabric components utilize the routing tables to determine how to route incoming packets (block 730). After block 730, method 700 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware, Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a communication fabric comprising a plurality of components;
a processor coupled to the communication fabric, wherein the processor is configured to:
read a value from a fabric block instance count register, wherein the value specifies a number of components in the communication fabric;
query each component of the communication fabric by reading a register for each component, wherein each register comprises at least an indication of a block type of a corresponding component and, for block types that are processing units, a number of processor cores and memory channels per processor core;
create a network graph based on said query of each component of the communication fabric; and
generate routing tables based on the network graph.

2. The system as recited in claim 1, wherein the processor is further configured to program the routing tables into the plurality of components of the communication fabric.

3. The system as recited in claim 2, wherein each component of the communication fabric is configured to route incoming packets based on a respective routing table.

4. The system as recited in claim 1, wherein each register comprises one or more of types and number of command and data ports, data bus width, and neighbor instance identifiers (IDs), and/or fabric IDs.

5. The system as recited in claim 1, wherein the fabric block instance count register stores an indication of a total number of fabric components in the system, and wherein the fabric block instance count register is located at a fixed address.

6. The system as recited in claim 1, wherein the network graph is created based on one or more of the indications of block type, processing units, number of processor cores, and memory channels per core.

7. The system as recited in claim 1, wherein the indication of a block type is an indication that a corresponding block is one of a coherent master, a non-coherent master, a coherent slave, a non-coherent slave or crossbar.

8. A method comprising:
reading, by a processor, a value from a fabric block instance count register, wherein the value specifies a number of components in a communication fabric;
querying, by the processor, each component of the communication fabric by reading a register for each component, wherein each register comprises at least an indication of a block type of a corresponding component and, for block types that are processing units, a number of processor cores and memory channels per processor core;
creating, by the processor, a network graph based on said querying of each component of the communication fabric; and
generating, by the processor, routing tables based on the network graph.

9. The method as recited in claim 8, further comprising programming the routing tables into a plurality of components of the communication fabric.

10. The method as recited in claim 9, further comprising creating, by the processor, the network graph based on one or more of the indications of block type, processing units, number of processor cores, and memory channels per core.

11. The method as recited in claim 8, wherein each register comprises one or more of types and number of command and data ports, data bus width, and neighbor instance identifiers (IDs), and/or fabric IDs.

12. The method as recited in claim 8, wherein the fabric block instance count register stores an indication of a total number of fabric components in the communication fabric, and wherein the fabric block instance count register is located at a fixed address.

13. The method as recited in claim 8, further comprising a security processor creating the network graph and generating routing tables based on the network graph.

14. The method as recited in claim 8, wherein the indication of a block type is an indication that a corresponding block is one of a coherent master, a non-coherent master, a coherent slave, a non-coherent slave or crossbar.

15. An apparatus configured to:
read a value from a fabric block instance count register, wherein the value specifies a number of components in a communication fabric;
query each component of the communication fabric by reading a register for each component, wherein each register comprises at least an indication of a block type of a corresponding component and, for block types that are processing units, a number of processor cores and memory channels per processor core;
create a network graph based on said query of each component of the communication fabric; and
generate routing tables based on the network graph.

16. The apparatus as recited in claim 15, wherein the apparatus is further configured to program the routing tables into a plurality of components of the communication fabric.

17. The apparatus as recited in claim 16, wherein the network graph is created based on one or more of the indications of block type, processing units, number of processor cores, and memory channels per core.

18. The apparatus as recited in claim 15, wherein each register comprises one or more of types and number of command and data ports, data bus width, and neighbor instance identifiers (IDs), and/or fabric IDs.

19. The apparatus as recited in claim 15, wherein the fabric block instance count register stores an indication of a total number of fabric components in the communication fabric, and wherein the fabric block instance count register is located at a fixed address.

20. The apparatus as recited in claim 15, wherein the indication of a block type is an indication that a corresponding block is one of a coherent master, a non-coherent master, a coherent slave, a non-coherent slave or crossbar.

* * * * *